March 21, 1961 M. E. BOURNS 2,976,506
PRESSURE RESPONSIVE ELECTRICAL INSTRUMENTS
Original Filed March 30, 1955
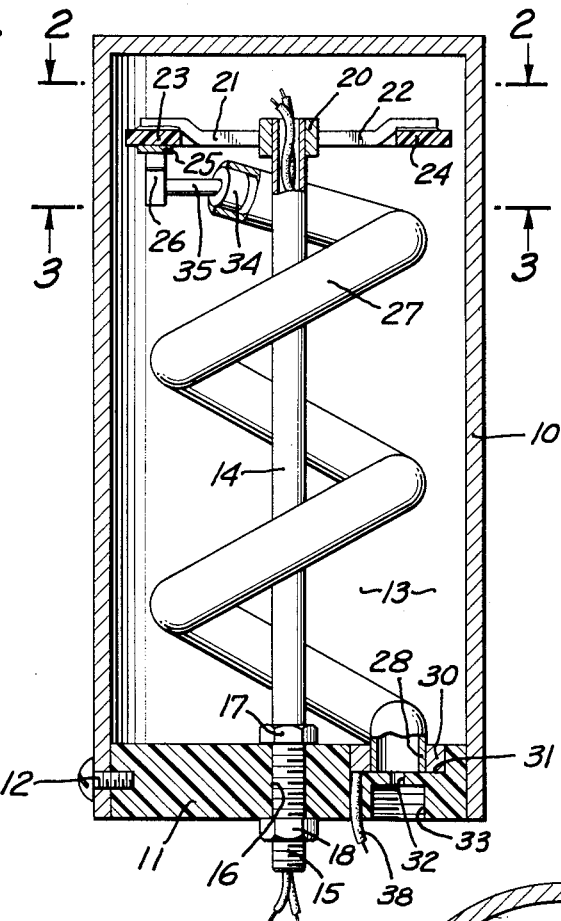
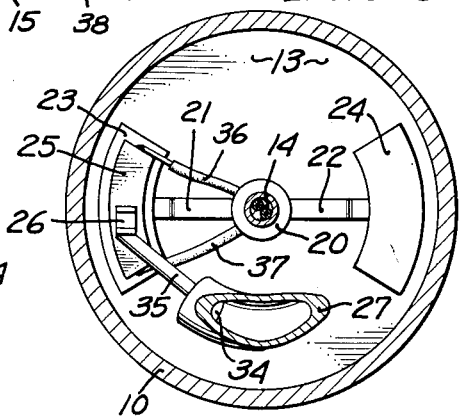
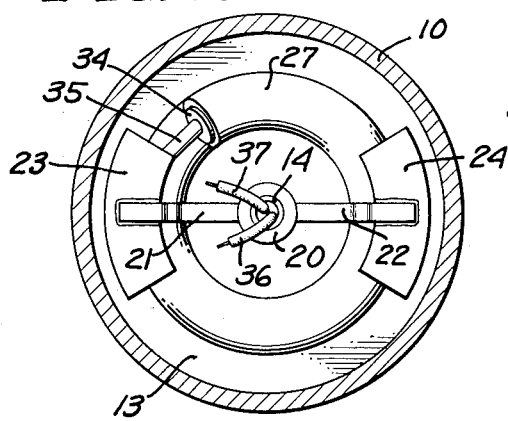
INVENTOR.
MARLAN E. BOURNS
BY
Herbert E. Kidder
AGENT

United States Patent Office 2,976,506
Patented Mar. 21, 1961

2,976,506
PRESSURE RESPONSIVE ELECTRICAL INSTRUMENTS

Marlan E. Bourns, 2482 Carlton Place, Riverside, Calif.

Continuation of application Ser. No. 497,878, Mar. 30, 1955. This application Apr. 25, 1960, Ser. No. 24,476

8 Claims. (Cl. 338—40)

The present invention relates to pressure responsive electrical instruments, and is a continuation of my pending application Serial No. 497,878, filed March 30, 1955, now Patent No. 2,934,729.

More specifically, the present invention has to do with temperature compensated pressure transducers of the type wherein fluid pressure is converted into an electrical signal that can be telemetered to a remote control center, or used to drive a meter, or utilized to actuate a control mechanism.

The primary object of the present invention is to provide a pressure transducer having a substantial length of travel of the pressure sensitive element, thereby obtaining extreme sensitivity and linearity of response without the use of motion-amplifying linkage.

Another object of the present invention is to provide a pressure transducer of the type described which is substantially unaffected by temperature change.

A further object of the invention is to provide a pressure transducer which is relatively insensitive to vibration and acceleration forces.

Still another object of the invention is to provide a pressure transducer which is simple and rugged in construction, inexpensive to manufacture, and extremely reliable in operation.

The foregoing objects are achieved by the use of a helical Bourdon tube enclosed within a suitable housing, the free end of said Bourdon tube carrying a wiper that makes electrical contact with a resistance element mounted on a bi-metallic support, which is attached to the free end of a flexible supporting tube. The bi-metallic support for the resistance element causes the element to be displaced with respect to the wiper responsive to temperature change, by an amount substantially equal to and in the same direction as the displacement of the free end of the Bourdon tube due to the temperature change. The helical Bourdon tube provides a substantial length of travel for the wiper mounted on its free end, and this permits use of a ressitance element of sufficient length to have the desired electrical characteristics. The flexible tube supporting the resistance element has substantially the same spring constant as the helical Bourdon tube, and the resistance element and wiper therefore vibrate in unison, so that there is no relative displacement of one with respect to the other.

The foregoing and other objects and advantages of the present invention will become apparent to those skilled in the art upon consideration of the following detailed description of the preferred embodiment thereof, reference being had to the accompanying drawings, wherein:

Figure 1 is a longitudinal sectional view through a pressure transducer embodying the principles of the invention;

Figure 2 is a transverse sectional view of the same, taken at 2—2 in Figure 1; and Figure 3 is a sectional view, taken at 3—3 in Figure 1.

In the drawings, the pressure transducer is enclosed within a housing consisting of a cylindrical, cup-shaped body 10 having a base plate 11 secured in the open end thereof by screws 12. The housing 10 and base plate 11 enclose a civity 13.

Disposed within the cavity 13 and extending parallel to the axis thereof is a thin-walled tube 14, one end of which is threaded at 15 and passes through a central aperture 16 in the base plate 11. Nuts 17 and 18 are screwed onto the threaded end portion 15, and these nuts are drawn up tight against opposite sides of the base plate 11, so as to secure the tube thereto.

Attached to the top end of the tube 14 is a collar 20 having oppositely directed bi-metal arms 21 and 22 projecting therefrom. Arcuate plates 23 and 24 of substantially identical size and configuration are attached to the outer ends of the arms 21, 22, respectively, and these plates are preferably formed of an electrically non-conductive material, such as plastic or the like. A thin layer of electrically conductive resistance material 25 is affixed to the bottom surface of the plate 23, and this is contacted by a wiper contact surface 26 mounted on the free end of a helical Bourdon tube 27.

The helical Bourdon tube 27 is centered within the cavity 13 and encircles the tube 14. The bottom end of the Bourdon tube is bent downwardly at 28, and this downwardly bent end portion is inserted through and brazed or soldered to an annular ring 30, which is seated within a circular cavity 31 in the closure member 11 and is firmly secured therein by the use of adhesives or the like. A small orifice 32 connects the interior of the Bourdon tube 27 with a tapped hole 33 in the bottom of the base plate 11, which is adapted to receive a suitable coupling for connecting the Bourdon tube to a fluid pressure line. The free, upper end of the Bourdon tube 27 is closed by a plug 34, and this plug has a stem 35 projecting from the outer end thereof which has the wiper contact 26 affixed to its outer end.

The ends of the resistance element 25 are connected to terminal wires 36 and 37, which pass through the hollow center of the tube 14 and project from the bottom end thereof. The wiper 26 is electrically connected to the walls of the Bourdon tube 27, and the latter serves as an electrical return for the wiper. The electrical signal is transmitted to the annular ring 30, and is transmitted thence by a terminal wire 38 to the outside of the housing.

The operation of the invention is believed to be clear from the foregoing description. Fluid pressure admitted to the interior of the helical Bourdon tube 27 causes the latter to uncoil somewhat, which results in the free end of the Bourdon tube moving in a circular path, concentric with the tube 14. This movement of the free end of the Bourdon tube shifts the wiper 26 along the length of the resistance element 25, causing a change in the voltage measured across any two of the terminal wires, which can be transmitted to a remote control center for conversion into pressure data. The multiple turns of the helical Bourdon tube provide a substantial amount of travel at the free end thereof for each increment of pressure change, and this eliminates the need for multiplying linkages or other motion-amplifying means, between the free end of the Bourdon tube and the wiper.

The bi-metallic arms 21 and 22 are so arranged that any change in the ambient temperature causes the arms to bend in the direction to compensate for displacement of the contact wiper 26 in the same direction due to the temperature change. Thus, any displacement of the resistance element 25 with respect to the wiper 26 due to temperature change is substantially eliminated, and the pressure transducer of the present invention provides a pressure reading that is free of temperature error.

The tube 14 is constructed so that its spring constant is substantially the same as the spring constant of the Bourdon tube 27. Thus, any forces applied to the instrument due to acceleration or vibration cause the resistance element 25 and wiper 26 to vibrate or otherwise move in unison. This eliminates relative displacement between the wiper and resistance element due to acceleration or vibration, and results in substantially complete elimination of error due to such vibration or acceleration forces.

The two opposed arcuate plates 23 and 24 on their respective arms 21 and 22 provide a balanced construction symmetrical about the center of the tube 14, and any tendency of the tube 14 to bend or twist in one direction due to the influence of vibration or acceleration on plate 23 and arm 21 is counteracted by an equal and opposite bending tendency due to the influence of the said force acting on plate 24 and arm 21. Thus, the instrument is relatively insensitive to vibration and acceleration forces.

While I have shown and described in considerable detail what I believe to be the preferred form of my invention, it will be understood that various changes may be made in the shape and arrangement of the several parts without departing from the broad scope of the invention as defined in the appended claims.

I claim:

1. A fluid pressure transducer comprising a base member, a helical Bourdon tube attached at one end to said base member, a wiper contact fixed to the free end of said helical Bourdon tube, and an elongated resistance element positioned to be wiped by said wiper contact, said resistance element being disposed with its longitudinal axis substantially parallel to the line of travel of said free end of said helical Bourdon tube.

2. A fluid pressure transducer comprising a base member, a helical Bourdon tube attached at one end to said base member, a wiper contact fixed to the free end of said helical Bourdon tube, a support member attached to said base and having a portion thereof disposed adjacent said free end of said Bourdon tube, an arcuate resistance element mounted on said portion of said support member and wiped by said contact, the centerline of said arcuate resistance element substantially coinciding with the line of travel of said wiper.

3. A fluid pressure transducer as defined in claim 2, wherein said support member is resilient and has substantially the same spring constant as said helical Bourdon tube.

4. A fluid pressure transducer comprising a base member, a helical Bourdon tube attached at one end to said base member, the other end of said Bourdon tube being movable in an arcuate path responsive to changes in the pressure differential between the inside and outside of the Bourdon tube, a resistance element having a contact element wiping thereon, one of said elements being attached to the free end of said Bourdon tube and means on said base member supporting the other of said elements.

5. A fluid pressure transducer as defined in claim 4, wherein said means supporting the other of said elements includes temperature responsive means for displacing said other element in the same direction and for the same distance as said one element is displaced due to the effect of change in temperature on said helical Bourdon tube.

6. A fluid pressure transducer as defined in claim 4, wherein said means supporting the other of said elements comprises a tube attached at one end to said base member and extending through the center of said helical Bourdon tube, a bi-metal arm attached to the other end of said tube and extending radially therefrom and said other element being mounted on the outer end of said bi-metal arm.

7. A fluid pressure transducer as defined in claim 6, wherein said tube is resilient and has substantially the same spring constant as said helical Bourdon tube, whereby said elements move in unison under the influence of acceleration or vibration.

8. A fluid pressure transducer comprising a base member, a helical Bourdon tube attached at one end to said base member, the other end of said Bourdon tube being movable in an arcuate path responsive to changes in the pressure differential between the inside and outside of the Bourdon tube, a resilient supporting tube fixed at one end to said base member and extending through said helical Bourdon tube along the longitudinal axis thereof, a pair of oppositely extending bi-metal arms fixed to the other end of said supporting, substantially identical arcuate plates fixed to the opposite ends of said bi-metal arms, a resistance element affixed to one of said arcuate plates, and a wiper contact attached to the movable end of said helical Bourdon tube and wiping on said resistance element, said supporting tube having substantially the same spring constant as said helical Bourdon tube, whereby said resistance element and said wiper contact move in unison under the influence of acceleration or vibration, and said bi-metal arms providing temperature compensation.

No references cited.